United States Patent
Martone et al.

(10) Patent No.: US 6,826,957 B2
(45) Date of Patent: Dec. 7, 2004

(54) SELF-CONTAINED PORTABLE AIR PRESSURE DECAY TEST APPARATUS

(75) Inventors: Christopher James Martone, Rochester, MI (US); Daniel W. Doubleday, Clinton Township, MI (US); Daniel Gerald Jones, Allenton, MI (US); Paul J. Boor, Macomb, MI (US); Raymond J. Sapienza, Fenton, MI (US); James Arthur Cole, Sterling Heights, MI (US); Joseph E. Safran, Orion, MI (US); Tony J. Deschutter, St. Clair Shores, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/383,782

(22) Filed: Mar. 7, 2003

(65) Prior Publication Data

US 2004/0173005 A1 Sep. 9, 2004

(51) Int. Cl.[7] .......................... G01M 3/02; G01M 3/26; G01M 3/32
(52) U.S. Cl. .................. 73/405 R; 73/492; 73/497; 73/498
(58) Field of Search ................. 73/40, 40.5 R, 73/49.1, 49.2, 49.3, 49.7, 49.8, 52

(56) References Cited

U.S. PATENT DOCUMENTS

| | | | | | |
|---|---|---|---|---|---|
| 1,701,876 | A | * | 2/1929 | Fleming | 73/47 |
| 3,805,593 | A | * | 4/1974 | Sandoz et al. | 73/49.2 |
| 3,894,424 | A | * | 7/1975 | Taylor et al. | 73/49.2 |
| 3,951,185 | A | * | 4/1976 | Bower et al. | 141/1 |
| 4,019,370 | A | * | 4/1977 | Allocco, Jr. | 73/45.1 |
| 4,109,513 | A | * | 8/1978 | Schott | 73/49.1 |
| 4,157,028 | A | * | 6/1979 | Moffett, III | 73/49.7 |
| 4,285,230 | A | * | 8/1981 | Hartness | 73/37 |
| 4,291,573 | A | * | 9/1981 | Richter et al. | 73/37 |
| 4,497,290 | A | * | 2/1985 | Harris | 123/179.11 |
| 4,534,208 | A | * | 8/1985 | Macin et al. | 73/49.3 |
| 4,979,390 | A | * | 12/1990 | Schupack et al. | 73/38 |
| 5,072,622 | A | * | 12/1991 | Roach et al. | 73/40.5 R |
| 5,357,800 | A | | 10/1994 | Reuter et al. | 73/121 |
| 5,638,741 | A | * | 6/1997 | Cisaria | 99/295 |

OTHER PUBLICATIONS

McMaster, Robert C., "Nondestructive Testing Handbook", 1982, vol. 1, p. 785.*

* cited by examiner

Primary Examiner—Hezron Williams
Assistant Examiner—David A. Rogers
(74) Attorney, Agent, or Firm—Laura C. Hargitt

(57) ABSTRACT

A portable air pressure decay test apparatus for leak testing of a sealed system includes a hollow housing, an air pump having an inlet and an outlet disposed in the housing, and a controller disposed in the housing and connected to the pump for controlling the operation of the pump. A test head is mounted on the housing for releasably attaching to an attachment point of a sealed system. The test head is in fluid communication with the outlet of the pump. When the test head is attached to the attachment point of the sealed system, the controller operates the pump to provide pressured air to the sealed system and raise the pressure in the sealed system to a predetermined value. After the predetermined value of pressure is reached, the controller stops the pump and monitors the air pressure in the sealed system for a predetermined time interval to measure an air pressure decay rate. The controller then compares the measured air pressure decay rate with a predetermined air pressure decay rate to indicate if a leak rate of the sealed system is acceptable. The apparatus preferably includes a power source connected to the pump and the controller disposed in the housing. The power source is preferably a removable battery or the like.

15 Claims, 3 Drawing Sheets

SELF-CONTAINED PORTABLE AIR PRESSURE DECAY TEST APPARATUS

BACKGROUND OF THE INVENTION

The present invention relates generally to sealed system testing equipment and, in particular, to a self-contained portable air pressure decay test apparatus.

Hydraulic systems, such as automotive vehicle brake systems, are well known. These brake systems may be tested in the assembly plant prior to delivery of the vehicle to ensure high quality operation. Brake systems are typically tested by utilizing a prior art testing device, or tester, that applies a predetermined force to the brake pedal or brake master cylinder. As the force is applied to the pedal or brake master cylinder, the distance that the pedal or cylinder travels over a predetermined length of time is measured. The distance traveled by the brake pedal versus time is compared to a predetermined value to assess the hydraulic integrity of the brake system. In addition, hydraulic system variations are such that they can result in prior art testing devices giving indications of a false negative result or a failed test even though there is no traceable sign of a leak.

Prior art testing devices, however, are typically mounted to a processing monument or a similar fixed point on an assembly line and are connected to the processing monument with hoses and electrical cables. Because the hoses and electrical cables essentially tether the testing device to the assembly line, the testing device disadvantageously has very limited mobility. This limits the assembly plant flexibility because the brake system can only be tested when the vehicle is adjacent the processing monument. Furthermore, the device is expensive to manufacture. In addition, the prior art testing apparatuses may cause occasional paint mutilations on the vehicle surface when the hoses and the electrical cables inadvertently contact the vehicle surface. The prior art testing device also increases assembly plant operations costs as a result of their required maintenance and is an operator ergonomic issue because of its mass, including the hoses and electrical cables attached thereto.

It is desirable, therefore, to provide an apparatus for testing hydraulc systems, such as an automotive vehicle brake system, that is portable and self-contained for easy and flexible use in an assembly plant operation.

SUMMARY OF THE INVENTION

The present invention concerns a portable air pressure decay test apparatus for leak testing of a sealed system. The apparatus includes a hollow housing, an air pump and associated valves and pressure measuring devices having an inlet and an outlet disposed in the housing, and a controller disposed in the housing and connected to the pump for controlling the operation of the pump, valves and pressure measuring device. A test head is mounted on the housing for releasably attaching to an access or attachment point of a sealed system. The test head is in fluid communication with the outlet of the pump. When the test head is attached to the attachment point of the hydraulic system, the controller operates the pump to provide pressured air to the sealed system and raise the pressure in the sealed system to a predetermined value. After the predetermined value of pressure is reached, the controller stops the pump, isolates the system and monitors the air pressure in the sealed system for a predetermined time interval to measure an air pressure decay rate. The controller then compares the measured air pressure decay rate with a predetermined air pressure decay rate to indicate if a leak rate of the sealed system is acceptable. The apparatus preferably includes a power source connected to the pump and the controller disposed in the housing. The power source is preferably a removable battery, a rechargeable battery, or the like.

Preferably, the hydraulic system is an automotive braking system and the attachment point to the braking system is the fill tube or opening of the master cylinder hydraulic fluid reservoir. The apparatus preferably includes an adapter foot attached to the housing that is adapted to clamp on to a threaded portion of the fill tube prior to testing the braking system. Preferably, the test head is connected to the outlet of the pump by an elongated pipe or rod. An actuator lever is attached at an upper portion of the housing and is operable to actuate the rod and test head and extend the rod and attached test head into the master cylinder hydraulic reservoir. An on/off switch is connected to the power source and the pump and is operable to start the pump when actuated. A plurality of pneumatic valves is disposed intermediate the outlet of the pump and the rod and test head. A pressure measuring device such as a transducer is pneumatically linked to the system through the test head and is operable to sense the pressure of the hydraulic system when a test cycle begins.

The portable air pressure decay unit is a fully self-contained ergonomically designed tool running on removable or rechargeable batteries. The benefits of the portable air pressure decay apparatus include, but are not limited to, lower tooling cost because the present invention is much cheaper to produce than the expensive prior art testing device. The present invention will also produce fewer variation related false negative test results and thus yield higher first time pass rates. The present invention also provides the ability to easily move the brake test operations within the assembly plant in order to balance the assembly line better and increase the assembly line efficiency. The present invention eliminates a processing monument in the assembly line, which increases the assembly plant flexibility. The present invention also eliminates potential paint mutilations caused by inadvertent contact of the air hoses and the electrical cables with the vehicle surface because the present invention advantageously does not require the external air hoses and electrical cables of the prior art testing device. The present invention also lowers assembly plant operations cost by reducing maintenance requirements because the present invention is much cheaper to produce than the prior art testing device. The present invention also provides improved operator ergonomics through the elimination of the mass of the prior art testing device as well as the bulky hoses and electrical cords.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
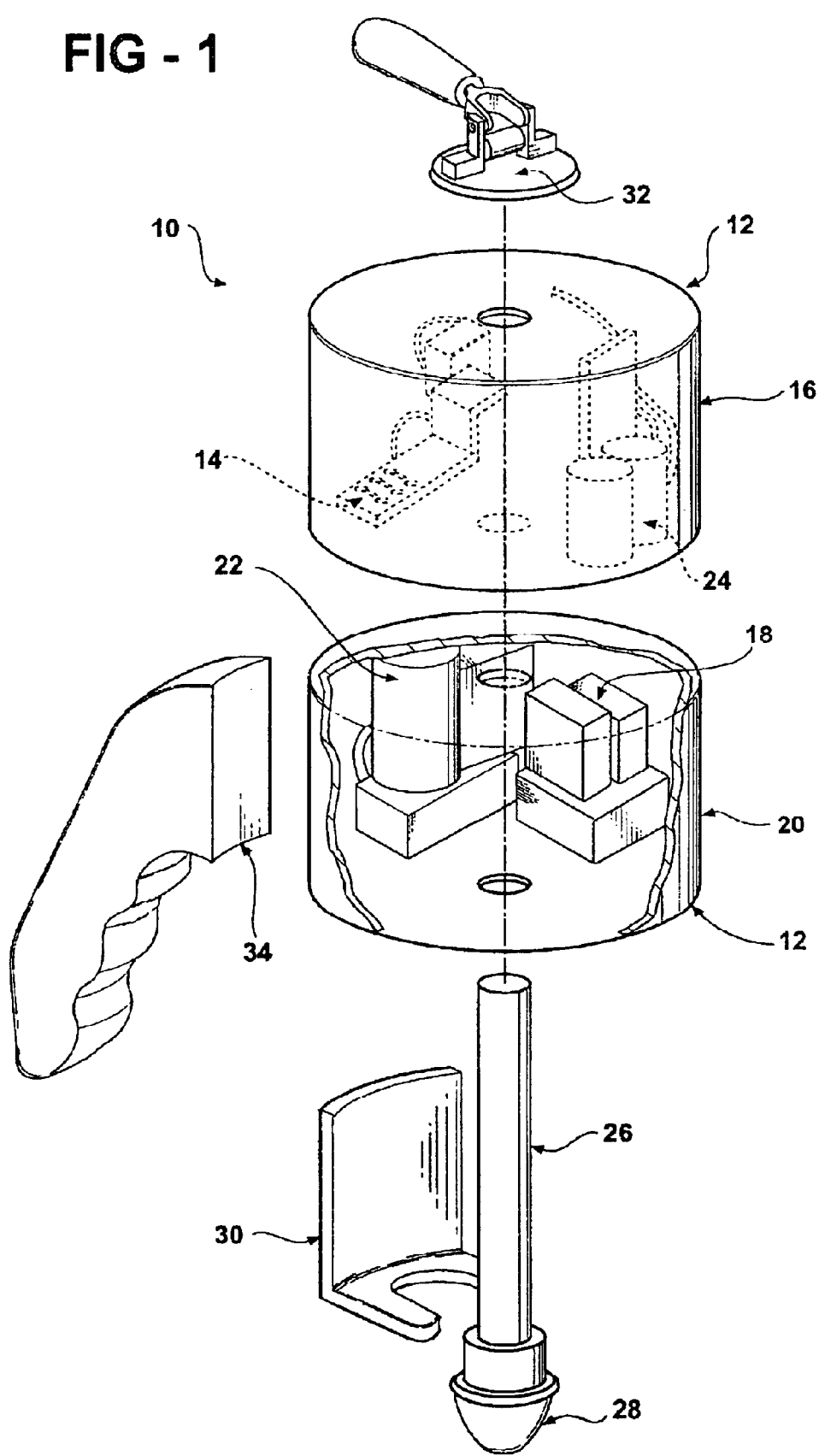
FIG. 1 is a partial cut away exploded perspective view of a portable air pressure decay test apparatus in accordance with the present invention.
Figure 4:
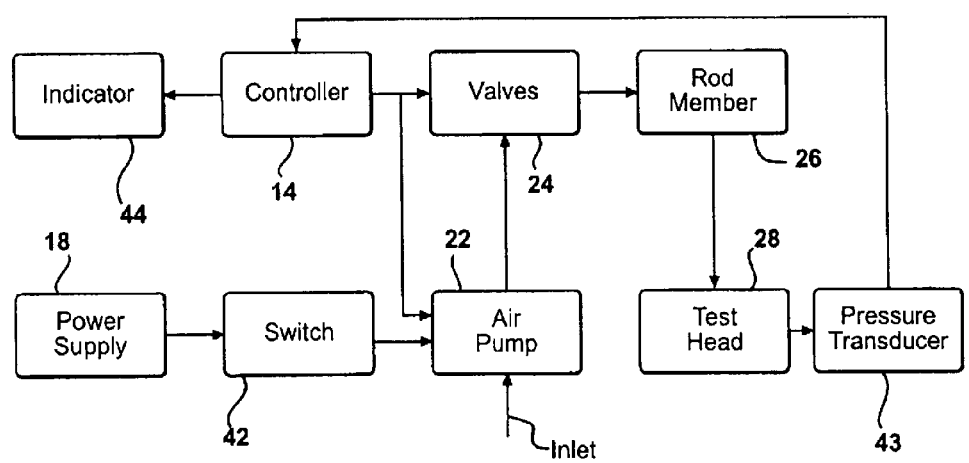
FIG. 4 is a schematic block diagram showing the electrical and pneumatic circuits of the portable air pressure decay test apparatus according to the present invention.

Referring now to FIGS. 1 and 4, a portable air pressure decay test apparatus in accordance with the present invention is indicated generally at 10. The apparatus 10 includes a housing 12 having a controller 14 disposed in an upper portion 16 thereof. The housing 12 is preferably constructed of a lightweight material including, but not limited to, plastic material or the like. The controller 14 is connected to a power supply 18, preferably a replaceable or a rechargeable battery. Alternatively, the battery 18 is replaced by another type of electrical power supply including, but not limited to, an extension cord or the like. The battery 18 is disposed in a lower portion 20 of the housing 12 with an air pump 22 and supplies electrical power to the controller 14 and the air pump 22. The air pump 22 includes an inlet, open to the atmosphere and an outlet that is connected to a plurality of pneumatic valves 24 disposed in the upper portion 16 of the housing 12. The inlet of the air pump 22 preferably includes a filter (not shown) attached thereto. The valves 24 and the pump 22 are also electrically connected to and are operable to be actuated by the controller 14. The valves 24 are further connected to a hollow rod member 26, a free end of which extends through apertures in the housing 12 to attach to a test head 28. An adapter foot 30 is attached to the lower portion 20 of the housing 12 adjacent the test head 28. An actuator lever 32 is attached to the upper portion 16 of the housing 12 and attaches to an opposed end of the rod member 26. The actuator lever 32 is operable to reciprocate the rod member 26. A handle member 34 attaches to an exterior surface of the upper portion 16 of the housing 12 and is adapted to be held by a human band. The handle 34 allows the apparatus 10 to be moved easily within, for example, an assembly plant to test the hydraulic system at multiple points in the assembly plant, outlined in more detail below.

Figure 2:
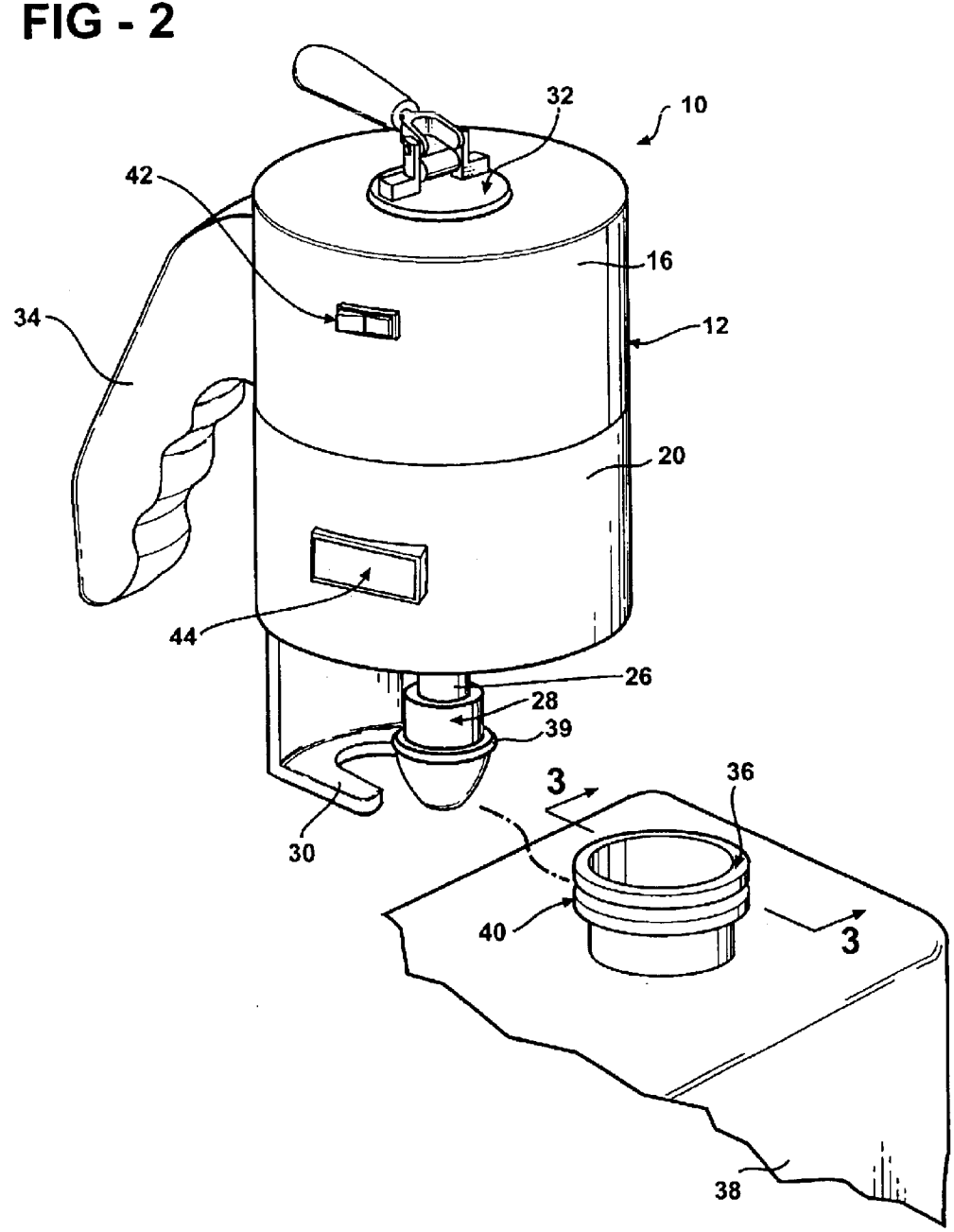
FIG. 2 is a perspective view of the portable air pressure decay test apparatus of FIG. 1 shown assembled and adjacent an attachment point of a hydraulic system.
Figure 3:
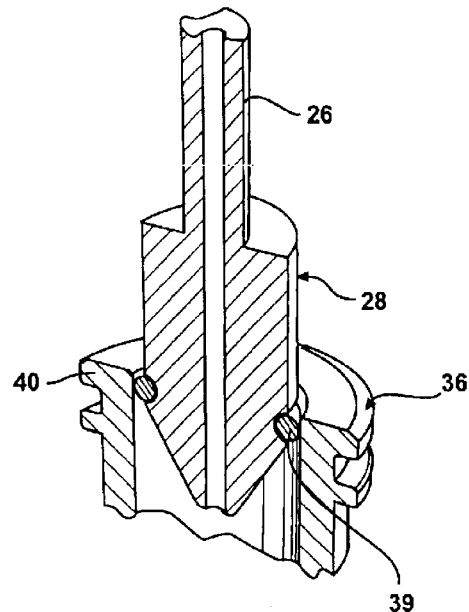
FIG. 3 is a partial perspective cross-sectional view taken along line 3—3 of FIG. 2.

Referring now to FIGS. 2 and 3, the testing apparatus 10 is shown assembled and adjacent a fill tube 36 of the master cylinder hydraulic fluid reservoir 38. The fill tube or opening 36 serves as an attachment point for testing the entire hydraulic system (not shown), such as an automobile brake system, outlined in more detail below. The fill opening 36 extends upwardly from an upper surface of the reservoir 38. The test head 28 includes an O-ring 39 or similar type sealing means mounted on an outer surface thereof for cooperating with an inner surface of the fill opening 36. The adapter foot 30 is adapted to clamp on to a threaded portion 40 of the fill opening 36.

The actuator lever 32 is operable to actuate the rod 26 and test head 28 and extend the rod 26 and attached test head 28 downwardly into the fill opening 36. An on/off or cycle start switch 42 is attached to an exterior surface of the housing 12 and the controller 14 and is operable to start the air pump 22 when actuated. A pressure transducer 43 is attached to the controller 14 and is pneumatically linked to the test head 28. The pressure transducer 43 is operable to sense the pressure of the sealed system and provide a signal to the controller during a test cycle, outlined in more detail below.

In operation, the adapter foot 30 is placed under the threaded portion 40 of the fill opening 36 of the master cylinder reservoir 38 to enable the action of the actuator lever 32 to force the test head 28 into the inner diameter of the fill opening 36. This action seals the test head 28 to the fill opening 36 by the interaction of the outer surface of the O-ring 39 and the inner surface of the fill opening 36. The hydraulic system is then ready for testing. An operator (not shown) initiates a test cycle by depressing the on/off switch 42 on the housing 12 that is attached to the controller 14. The controller 14 starts the air pump 22, which supplies pressurized air to the sealed system through the rod member 26 and test head 28. The controller 14 controls the flow of air into the brake system by modulating the pneumatic valves 24. Once the air pressure in the sealed system reaches a predetermined pressure, the controller 14 closes the pneumatic valves 24 and stops the pump 22. The air pressure in the sealed system is allowed to stabilize, after which the controller 14 begins a test cycle. During the test cycle, the controller 14 monitors the air pressure inside of the sealed system by utilizing the pressure transducer 43 that is pneumatically linked to the system through the test head 28. The controller 14 monitors the air pressure in the sealed system for a predetermined time interval to measure an air pressure decay rate. The controller 14 then compares the measured air pressure decay rate with a predetermined air pressure decay rate to determine if a leak rate of the sealed system is acceptable. The controller 14 then triggers an indicator 44, such as an LED screen or the like, to alert the operator as to the pass or fail status of the system.

After the test is complete, the air pressure is bled off and the apparatus 10 is removed from the sealed system and advantageously used again on another sealed system.

Preferably, the apparatus 10 is used advantageously on a number of sealed systems sequentially, such as vehicle braking systems in an automotive assembly plant. By virtue of the lightweight construction of the housing 12 of the apparatus 10 and the portability afforded by the handle member 34, the apparatus 10 may be used at any number of points in an assembly plant (not shown) having an assembly line (not shown). The apparatus thus provides the ability to move the brake test operations easily within the assembly plant in order to balance the assembly line better and increase the assembly line efficiency.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A portable air pressure decay test apparatus for leak testing of a sealed system, comprising:

a hollow housing;

an air pump having an inlet and an outlet, said pump being disposed in said housing for providing pressured air at said outlet;

a controller disposed in said housing and connected to said pump for controlling the operation of said pump;

an actuator lever attached to an upper portion of said housing and to a first end of a rod member, the rod member extending through said housing; and a test head attached to a second end of said rod member for releasably attaching to an attachment point of a sealed system, said test head being in fluid communication with said outlet of said pump, said actuator lever operable to move said rod member and said test head relative to said housing, whereby when said test head is attached to the attachment point of the sealed system, said controller operates said pump to provide pressured air to the sealed system and raise the pressure in the sealed system to a predetermined value, and when said predetermined value is reached, the controller stops said pump and monitors the air pressure in the sealed system for a predetermined time interval to measure an air pressure decay rate and compares the air pressure decay rate measured with a predetermined air pressure decay rate to indicate if a leak rate of the sealed system is acceptable.

2. The apparatus according to claim 1 including an electrical power source attached to said pump and said controller for providing power to said pump and said controller.

3. The apparatus according to claim 2 wherein said power source is one of a removable battery and a rechargeable battery disposed in said housing.

4. The apparatus according to claim 1 including an indicator connected to said controller, wherein said controller sends a signal to trigger said indicator to indicate a pass or fail status of the hydraulic system.

5. The apparatus according to claim 1 including an adapter foot extending from a lower portion of said housing for securing said housing and said test head to the attachment point of the sealed system.

6. The apparatus according to claim 1 including a handle attached to said housing for holding in a human hand.

7. The apparatus according to claim 1 including at least one pneumatic valve disposed in said housing connected between said outlet of said pump and said test head and connected to said controller, said controller operable to actuate said at least one valve to provide pressured air from said pump to said test head.

8. The apparatus according to claim 1 including a sealing means attached to said test head for sealing between an outer surface of said test head and an inner surface of the attachment point of the sealed system.

9. A portable air pressure decay test apparatus for leak testing of a sealed system, comprising:

a portable housing;

an air pump disposed in said housing, said pump including an inlet and an outlet;

a controller disposed in said housing;

an actuator lever attached to an upper portion of said housing and to a first end of a rod member, the rod member extending through said housing;

a test head attached to a second end of said rod member and extending from said housing for releasably attaching to an attachment point of a sealed system, said test head being in fluid communication with said outlet of said pump, said test head including a pressure transducer therein, said pressure transducer connected to said controller, said actuator lever operable to move said rod member and said test head relative to said housing;

at least one pneumatic valve disposed in said housing connected between said outlet of said pump and said test head and connected to said controller, said controller operable to actuate said at least one valve to provide pressured air from said pump to said test head; and an indicator attached to said housing and connected to said controller, whereby when said test head is attached to the attachment point of the sealed system, said controller operates said pump to provide pressured air to the sealed system and raise the pressure in the sealed system to a predetermined value, and when said predetermined value is reached, the controller stops said pump and said pressure transducer sends a signal to said controller to enable said controller to monitor the air pressure in the sealed system for a predetermined time interval to measure an air pressure decay rate and said controller compares the air pressure decay rate measured with a predetermined air pressure decay rate to determine if a leak rate of the sealed system is acceptable, and said controller sends a signal to said indicator to indicate whether the leak rate test is or is not acceptable.

10. The apparatus according to claim 9 including a battery disposed in said housing and connected to said air pump and said controller for providing electrical power thereto.

11. The apparatus according to claim 10 wherein said battery is a removable battery.

12. The apparatus according to claim 10 wherein said battery is a rechargeable battery.

13. The apparatus according to claim 10 including an on/off switch attached to said housing and connected to said battery for providing power from said battery to said controller and said air pump.

14. A portable air pressure decay test apparatus for leak testing of a sealed system, comprising:

a hollow housing;

an air pump having an inlet and an outlet, said pump being disposed in said housing for providing pressured air at said outlet;

a controller disposed in said housing and connected to said pump for controlling the operation of said pump;

a test head mounted on said housing for releasably attaching to an attachment point of a sealed system, said test head being in fluid communication with said outlet of said pump; and at least one pneumatic valve disposed in said housing connected between said outlet of said pump and said test head and connected to said controller, said controller operable to actuate said at least one valve to provide pressured air from said pump to said test head, whereby when said test head is attached to the attachment point of the sealed system, said controller operates said pump to provide pressured air to the sealed system and raise the pressure in the sealed system to a predetermined value, and when said predetermined value is reached, the controller stops said pump and monitors the air pressure in the sealed system for a predetermined time interval to measure an air pressure decay rate and compares the air pressure decay rate measured with a predetermined air pressure decay rate to indicate if a leak rate of the sealed system is acceptable.

15. The apparatus according to claim 14 including an actuator lever attached to an upper portion of said housing and to a first end of a rod member, the rod member extending through said housing, a second end of said rod member being attached to said test head, said actuator lever operable to move said rod member and said test head relative to said housing.

* * * * *